(12) United States Patent
Sebastian

(10) Patent No.: US 6,973,313 B1
(45) Date of Patent: Dec. 6, 2005

(54) HEURISTIC ALGORITHM/PROTOCOL TO DETERMINE THE NEAREST AVAILABLE GATEWAY FOR A MOBILE CLIENT

(75) Inventor: Joby T. Sebastian, San Jose, CA (US)

(73) Assignee: Openwave Systems Inc., Redwood City, CA (US)

( * ) Notice: Subject to any disclaimer, the term of this patent is extended or adjusted under 35 U.S.C. 154(b) by 438 days.

(21) Appl. No.: 10/112,262

(22) Filed: Mar. 29, 2002

(51) Int. Cl.[7] ............................ H04Q 7/20; H04L 12/66
(52) U.S. Cl. ............... 455/445; 455/432.1; 455/435.2; 455/435.3; 455/436; 370/353; 370/354; 370/331
(58) Field of Search .......................... 455/445, 432.1, 455/435.2, 435.3, 436, 440, 520; 370/353, 370/354, 331

(56) References Cited

U.S. PATENT DOCUMENTS

| | | | |
|---|---|---|---|
| 6,067,442 A * | 5/2000 | Wiedeman et al. | ........ 455/13.1 |
| 6,404,864 B1 * | 6/2002 | Evslin et al. | .......... 379/112.01 |
| 6,424,638 B1 * | 7/2002 | Ray et al. | ..................... 370/331 |
| 6,590,880 B1 * | 7/2003 | Maenpaa et al. | ........... 370/331 |
| 6,708,031 B2 * | 3/2004 | Purnadi et al. | ............. 455/436 |
| 6,775,251 B1 * | 8/2004 | Wiedeman et al. | ......... 370/316 |
| 2002/0044547 A1 * | 4/2002 | Dalton et al. | ................ 370/356 |
| 2002/0045422 A1 * | 4/2002 | Iwase et al. | .................... 455/1 |

* cited by examiner

Primary Examiner—Sonny Trinh
Assistant Examiner—Huy Phan
(74) Attorney, Agent, or Firm—Blakely, Sokoloff, Taylor & Zafman LLP

(57) ABSTRACT

A method and apparatus for selecting an optimum gateway for a mobile client are described. The mobile client receives an acknowledgement from a home agent, indicating that the mobile client has moved from the home agent to a foreign agent. An optimum gateway is then determined from several gateways and then selected for the mobile client.

35 Claims, 6 Drawing Sheets

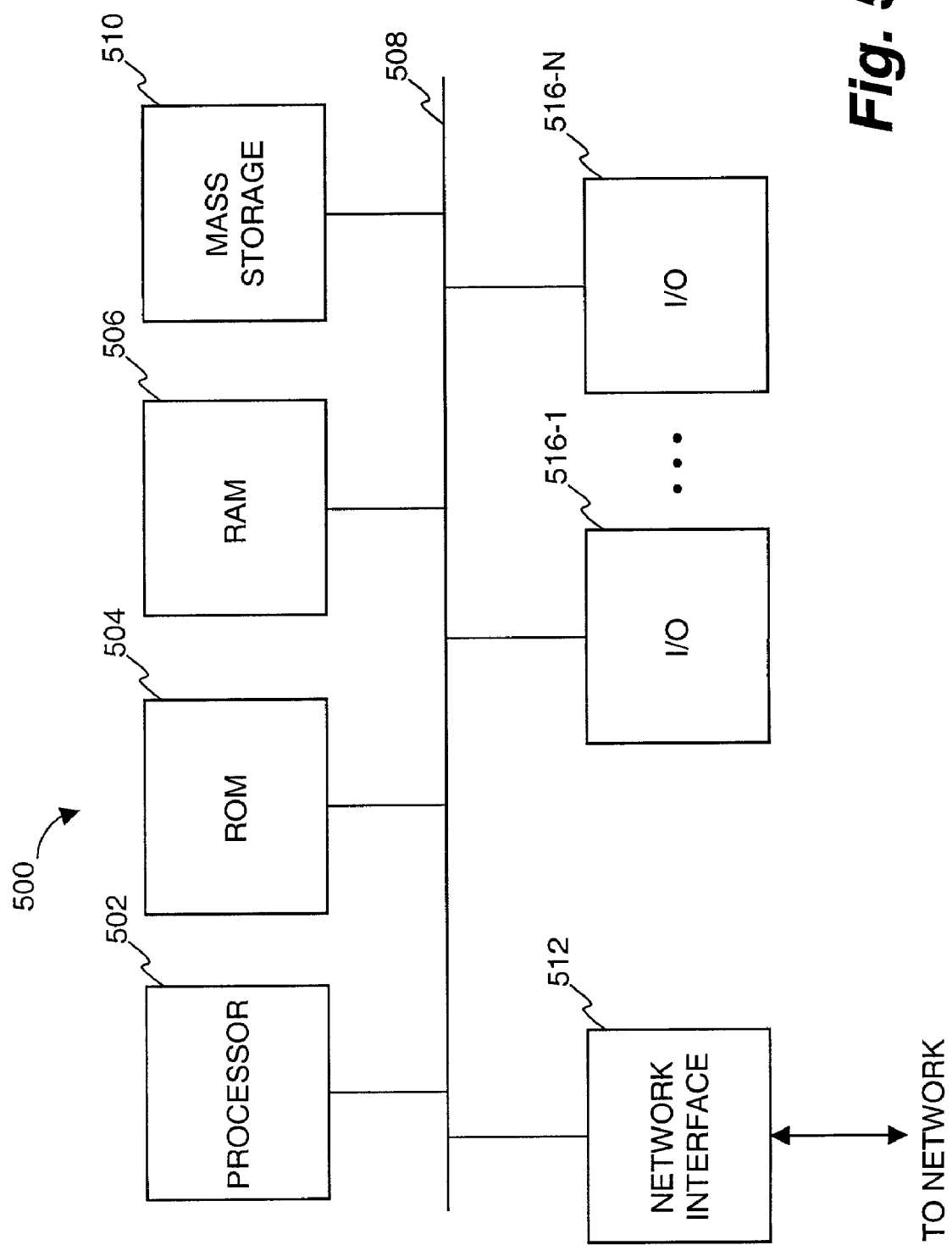

HEURISTIC ALGORITHM/PROTOCOL TO DETERMINE THE NEAREST AVAILABLE GATEWAY FOR A MOBILE CLIENT

FIELD OF THE INVENTION

The present invention relates to a mobile client on an Internet Protocol (IP) network, and more particularly, to methods and systems for selecting an IP based gateway/server for such a mobile client.

BACKGROUND OF THE INVENTION

Current technology allows people to access the Internet using mobile wireless devices, such as cellular telephones, personal digital assistants (PDAs), and two-way pagers. In the case of a cellular telephone, for example, the cellular telephone network normally directs Internet traffic from mobile devices to a router connected to the Internet. The router handles the Internet traffic between the Internet and the cellular telephone site. As the user moves from a point A near a first cell site to another point B near a second cell site, the cellular telephone connection will automatically change from the first cell site to the second cell site.

FIG. 1 illustrates an example of a cellular telephone system 100. A wireless client 102 (e.g., a cellular telephone, PDA, or two-way pager) establishes a connection to a first cell site 110. The Internet traffic from the wireless client 102 is transmitted to the first cell site 110. The cell site separates the Internet traffic and sends the Internet traffic to a router 112 and from the router to the default gateway 114. The default gateway is preprogrammed into the wireless client and stored in the wireless client's memory so that when the client 102 establishes a connection to the Internet, the connection is through a default gateway such as gateway 114. The default gateway 114 also includes information relating to directing Internet traffic to and from the client 102.

For example, if an email is sent from the client 102, then the email is routed to the default gateway 114 and the default gateway 114 forwards the data to the addressee. Similarly, if an email is sent to the wireless client 102, the default gateway 114 receives and then holds the email until the client 102 establishes an Internet connection through the default gateway 114. The default gateway 114 then forwards the email to the client 102. Client 102 requests for data on the Internet are similarly routed through the default gateway 114.

The default gateway 114 also determines which router (i.e. home agent 112) is used to establish the connection to the client 102.

In FIG. 1, a wireless client 102 is shown in a first position 102A and establishing the connection to the first cell site 110. As the wireless client moves to a second position 102B, the connection is automatically switched to a second cellular site 130 according to standard cellular system protocols.

When the client 102 establishes a new connection to the second cellular site 130, the cellular site 130 may use a different agent or router (i.e. a foreign agent 132), to direct and handle the Internet traffic for the cellular site 130. If the router is changed, according to standard mobile IP protocol, the client 102 notifies the home agent 112 to tunnel the Internet traffic through the foreign agent 132 to the client 102. The home agent 112 acknowledges the client about the redirection.

The client 102 can also include lists of multiple gateways 114, 120, 122. The list is typically prioritized so that when the client 102 first establishes a connection to the cellular site, the connection is attempted through each of the listed gateways 114, 120, 122, according to the priority of the gateway 114, 120, 122. The operating concept is to allow the client 102 to establish a connection to a default gateway 114 ideally, but alternate gateways 120, 122, are available in case the default gateway 114 is too busy or otherwise unavailable. This allows the client 102 to establish a more robust connection.

If the client 102 has moved from the home agent 112 and the first cell site 110 to the second cell site 130 and the foreign agent 132, then the client 102 maintains the connection through the default gateway 114. Unfortunately, the default gateway 114 may not be the most efficient gateway through which to route the Internet traffic. For example, the default gateway 114 and the foreign agent 132 are connected via the Internet 142 through a number of hops or nodes in the Internet. The number of hops and the time required for the Internet traffic to travel between the default gateway 114 and the foreign agent 132 maybe much longer than an alternate gateway such as gateway 120 or gateway 122. As a result, the Internet traffic between the client 102 and the foreign agent 132 through the default gateway 114 can be delayed and therefore subject to more errors, delays and other problems.

One possible method to resolve the issues of routing the Internet traffic through the foreign agent 132 and the default gateway 114 is to provide access to a list of alternate gateways in the client. The user can then manually select an alternate gateway that might result in a more efficient routing than the default gateway 114. One of the problems with this solution is that the user typically does not know which, if any, of the alternate gateways 120, 122 may be more efficient. Secondly, the user may not know how to select an alternate gateway 120, 122. Thirdly, to provide enough alternate gateways to be effective in the client 102 would require a large list of alternate gateways. A large list of gateways makes it even more difficult for the user to select a more efficient gateway from the list. Further still the large list of gateways would consume a large amount of memory space in the client 102. Typically mobile clients do not have a large quantity of memory so therefore storing many gateway addresses in the client memory is inefficient use of a very limited resource. Additionally, if a new gateway is added to the cellular network, then that new gateway must then be added to the client's list. Updating the list of gateways accessible to the user can be yet another cumbersome process. It can also be a non-user friendly annoyance if the user must manually select a gateway. Mobile or wireless-type Internet devices should be more user-friendly and not more cumbersome and complicated.

SUMMARY OF THE INVENTION

The present invention includes a method and apparatus according to which, in response to a mobile client having changed locations, an optimum gateway for the mobile client is determined from multiple gateways, and the optimum gateway is then selected for the mobile client.

BRIEF DESCRIPTION OF THE DRAWINGS

The present invention is illustrated by way of example and not limitation in the figures of the accompanying drawings in which like references indicate similar elements, and in which:

FIG. 5 is a high-level block diagram of a computer system.

DETAILED DESCRIPTION

A system and method of determining and optimum application gateway for a mobile wireless Internet-enabled client are described. When a mobile wireless client establishes a connection to the Internet via a cellular system or other equivalent carrier network, the initial connection is established to a default application gateway or an alternate application gateway. Then as the mobile client moves from the first cell site to a second cell site and onto subsequent cell sites, accessing the initially selected gateway may not be the most optimum route. From the current location of the mobile client, there could be another applications gateway that could be optimum. Therefore, what is described herein is a method of selecting an optimum gateway during the same session, as the client moves from one network to another.

Figure 2A:
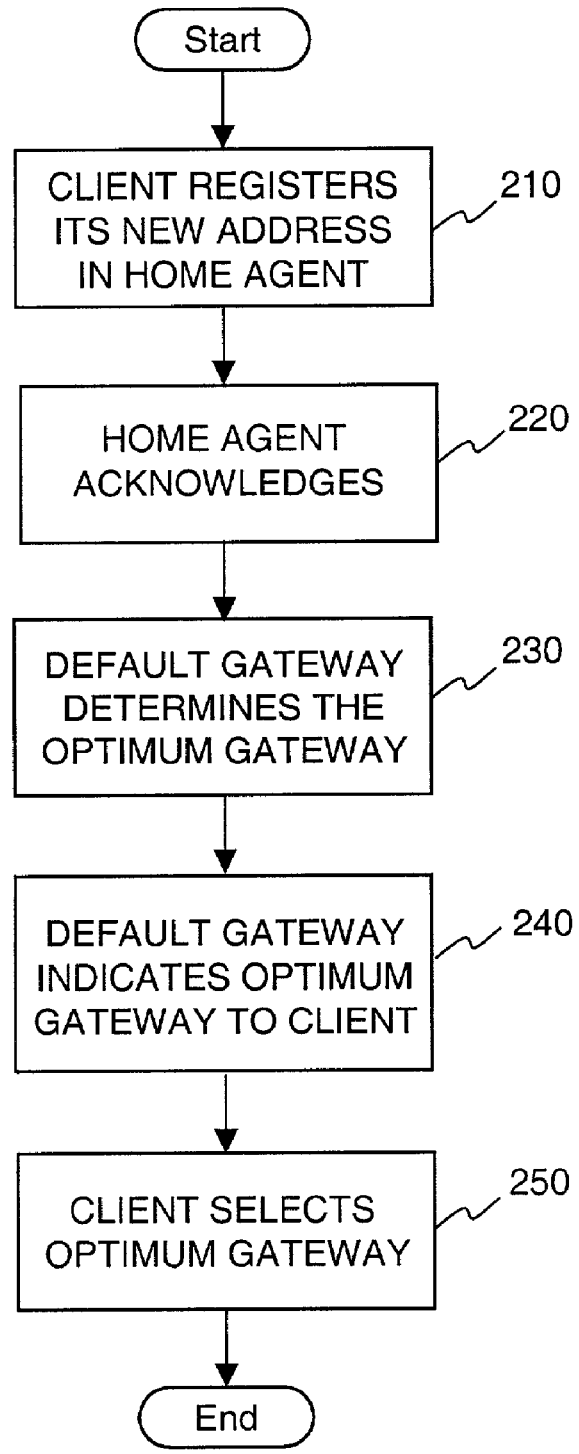
FIG. 2A illustrates a process of determining an optimum gateway.

FIG. 2A illustrates one embodiment of a process of determining an optimum gateway. First, in response to the client moving from one wireless network to another, in block 210 the client registers its new address with the home agent. The home agent acknowledges the client that it has received the new address of the client in block 220. Next in block 230, an optimum gateway for the client is automatically determined. The process of automatically determining the optimum gateway may be performed by the default gateway, for example, but may be initiated by a request from the client when the client moves from one wireless network to another. In block 240, the default gateway indicates the optimum gateway to the client in a response to the client's request. Then in block 250, the gateway which was determined to be the optimum gateway is automatically selected by the client. All further Internet-bound communication by the client is done via the newly selected (optimum) gateway, until the client again moves to another wireless network.

In one embodiment, the process of determining the optimum gateway in block 230 includes testing each one of several gateways. For example, one of the several gateways is first selected for testing. The selected gateway is then tested, and the test results are recorded. This process is then repeated for each of the remaining gateways to be tested, and the optimum gateway is determined based on the aggregated test results.

Figure 2B:
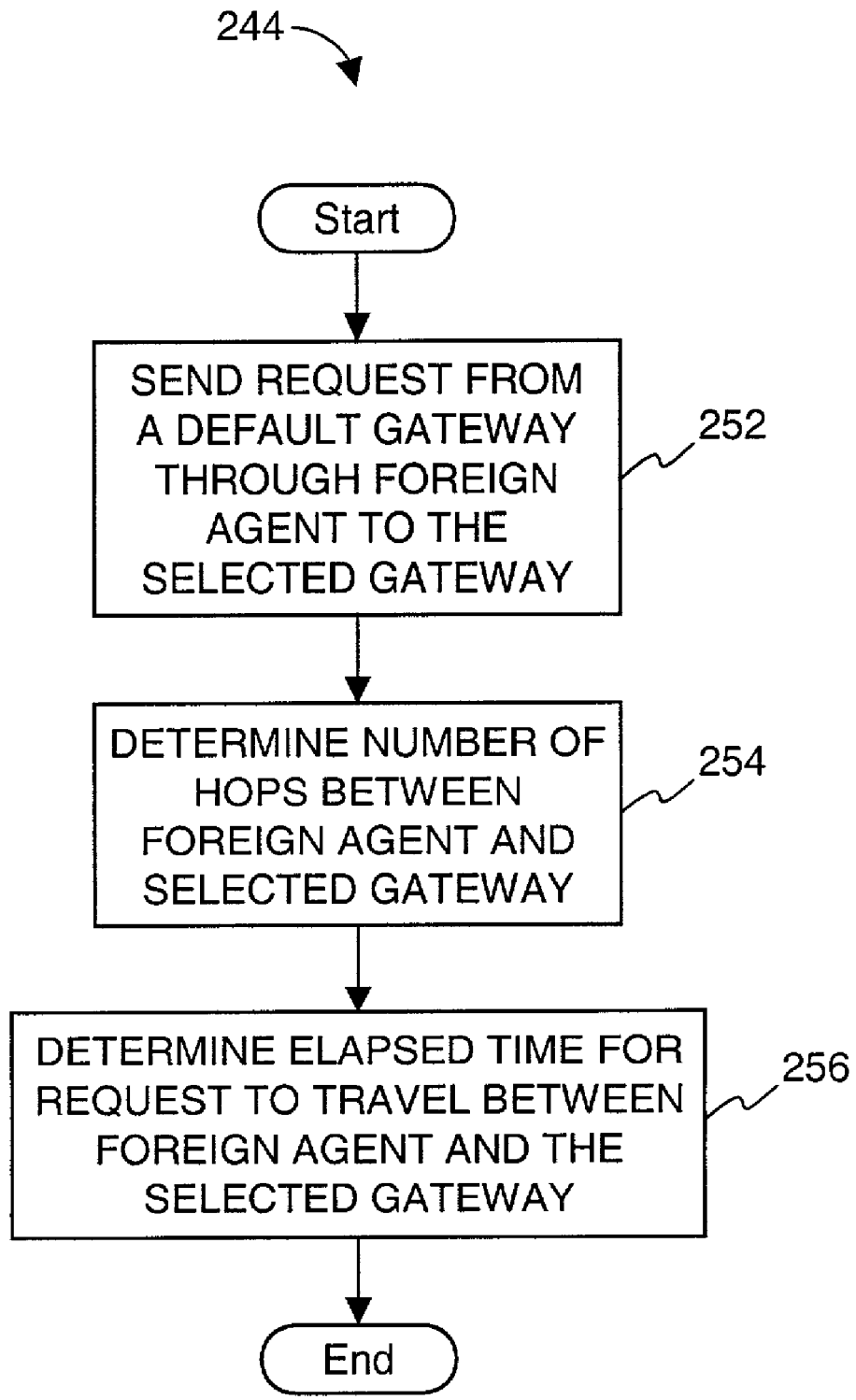
FIG. 2B shows a process of testing a selected gateway.

FIG. 2B shows one embodiment of the process of testing a selected gateway to determine the optimum gateway. First, a request for route cost information is sent from the default gateway through the foreign agent to the selected gateway. The request for route cost information and any corresponding response may comply to a protocol created specifically for the purpose of gathering route cost information and may operate on top of the well-known Internet Protocol (IP). The specific details of such protocol are not necessary for an understanding of the present invention and can be easily derived by those skilled in the art based on this description. In response to the request for route cost information, in block 254, the number of hops the request traversed between the foreign agent and the selected gateway is counted. A hop is a measurement of the numbers of times the request changes nodes. For example, a hop can be the transfer of a request from a first node to a second node such as from one server. In block 256, the elapsed time for the request to travel from the foreign agent to the selected gateway is determined. In one embodiment, it is the default gateway 114 which counts the number of hops and the elapsed time for the request. In one embodiment, the number of hops and/or the elapsed time required for the request to travel between the foreign agent and the selected gateway are included in, or can easily be computed from, information in an IP header of the request.

In one embodiment, the optimum gateway is determined as the gateway associated with the least number of hops. In another embodiment, the optimum gateway is determined as the gateway associated with the least elapsed time. In yet another embodiment, the optimum gateway is determined based on some combination, formula or algorithm that takes into account the number of hops, elapsed time and/or other criteria. In other embodiments, other types of information such as the IP addresses of intermediate routers which convey the request can be used to determine the optimum gateway. This information can be easily obtained from the IP headers. For example, the geographic locations or regions of intermediate routers might be determined based on their IP addresses; an optimum gateway can then be identified based at least in part on the geographic locations or regions of the intermediate routers.

Referring again to FIG. 1, an example of how the above-described process can be applied will now be discussed. First the wireless client 102 is in position 102A and establishes an initial connection through cellular site 110. Cellular site 110 directs Internet traffic through the home agent 112 to the default gateway 114 and off to the Internet. Eventually, the mobile wireless client has moved to position 102B and establishes a connection with a second cellular site 130. The second cellular site 130 is connected to a foreign agent (a router) 132. The foreign agent 132 represents a different network than the home agent 112 and therefore the wireless client 102 has moved from the first network (represented by home agent 112) to a second network (represented by foreign agent 132). Next, the client 102 receives a notification that it has changed networks and therefore the client 102 initiates an optimum gateway selection.

The client at location 102B sends the request to the default gateway 114 to determine the optimum gateway. The request includes an instruction to record the number of hops, address of each intermediate router in each hop and the time taken for each intermediate hop from the client to the default gateway 114.

The default gateway 114 receives the request from the client and collects intermediate hop information contained in the request. The default gateway 114 can also determine the address of the foreign agent 132 from the information collected from the request.

The default gateway 114 selects a series of gateways. The selection of gateways may be made from, for example, an administratively configured list of gateways, a heuristic approach, or the intermediate router information obtained from the client request or from the client profile or randomly.

As one example, the default gateway 114 may select gateway 120 to test against the current default gateway 114. Therefore, the default gateway 114 sends a request routed via the foreign agent 132 to the gateway 120. This request is also instructed to record the number of hops, address of each intermediate router in each hop and the time taken for each intermediate hop from the default gateway 114 to the gateway 120.

As another example, the default gateway 114 may select gateway 120 and gateway 122 to test against the current default gateway 114. Therefore, the default gateway 114 sends a request via the gateway 122, foreign agent 132 respectively, to the gateway 120. This request is also instructed to record the number of hops, IP address of each intermediate router in each hop, and the time taken for each intermediate hop from the default gateway 114 to the gateway 120.

The gateway 120 receives the request from the default gateway 114 and collects intermediate hop information contained in the default gateway request. The gateway 120 responds to the default gateway 114 with the information collected from the request sent by the default gateway 114.

The default gateway 114 receives the response from the gateway 120 containing the aforementioned intermediate route information. From the obtained information, the default gateway 114 computes the route cost from the gateway 122 to foreign agent 132 and foreign agent 132 to gateway 120.

If the default gateway 114 is configured to test with more gateways, the process could be repeated with different gateways. The default gateway 114 may want to test with the selected gateways multiple times to obtain a more accurate route cost value.

Thus, the default gateway 114 obtains the route cost from the client at location 102B to the default gateway 114, client at location 102B to the gateway 120 and gateway 122 to client at location 102B. The default gateway 114 determines the optimum gateway from default gateway 114, gateway 120 and gateway 122, based on their relative route costs (e.g., number of hops, elapsed time).

The default gateway 114 then responds to the client's initial request with information indicating the optimum gateway. The client receives the updated gateway information and selects that gateway as the new default gateway. All further Internet-bound communication by the client is done via this newly selected gateway, until the client again moves to another wireless network.

Figure 3:
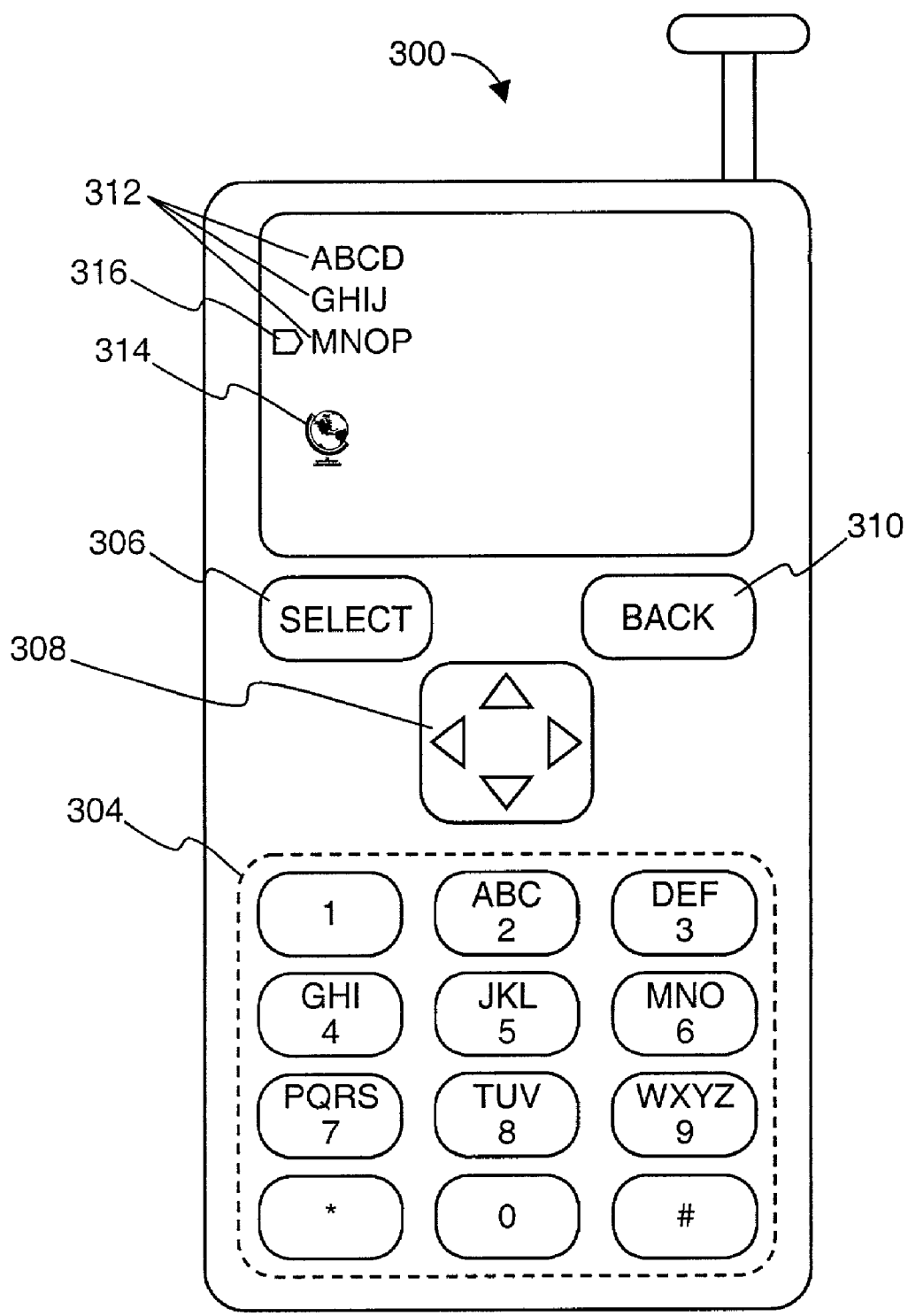
FIG. 3 illustrates a web-enabled cellular telephone.

FIG. 3 illustrates an example of a web-enabled cellular telephone 300 that can be used as a mobile user terminal (client) such as mentioned above. The illustrated web-enabled cellular telephone 300 includes a display screen 302, an alphanumeric, keypad 304 and several navigational buttons 306, 308, 310. As shown, the display screen 302 displays a page of information. The page includes data elements including text 312, an icon 314 and a cursor 316. Each one of the data elements 312, 314 on the displayed page, is typically a link or hyperlink to another page of information or an address or phone number or other data. The data elements 312, 314 can alternatively link to applications such as email or a phonebook or an address book or other applications. The keypad 304 includes several keys (i.e. keys "1–9", "0", "*" and "#") for data entry. The navigation buttons 306, 308, 310 include a select button 306, a cursor movement button 308 and a back navigational button 310. The cursor movement button 308 allows a user to move the cursor 316 from one text entry 312 or icon 314 to the next. The select button 306 activates the selected the text entry 312 or icon 314 that was selected by the cursor 316. The back navigational button 310 causes a page that was displayed immediately before the currently displayed page to be displayed on the screen 302.

Figure 4:
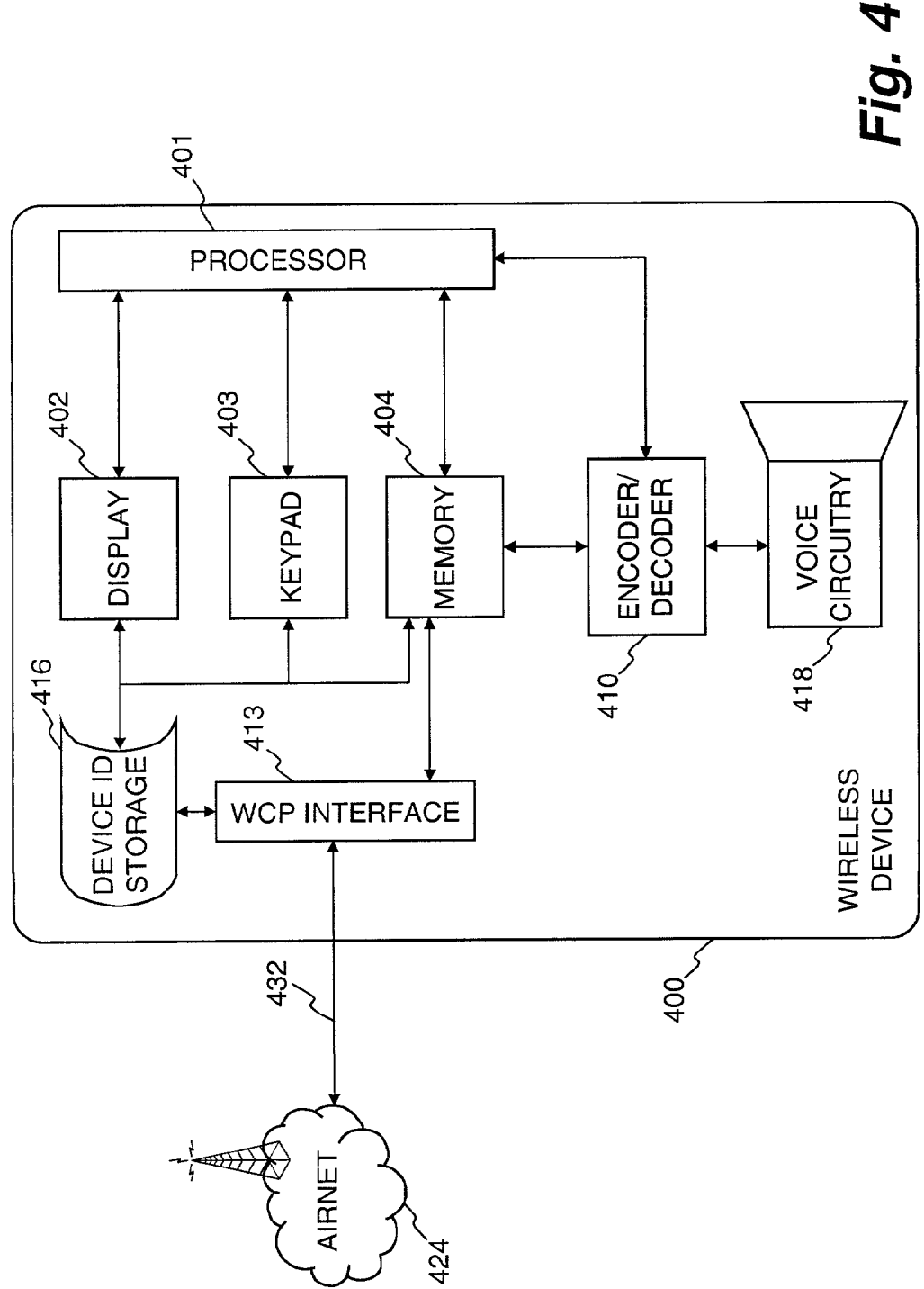
FIG. 4 illustrates internal features of a web-enabled cellular telephone.

FIG. 4 illustrates an example of the internal components of a web-enabled cellular telephone or other wireless Internet enabled device 400, such as the one shown in FIG. 3. The wireless device 400 includes a processor 401, which may be or may include any of a general or special purpose programmable microprocessor, Digital Signal Processor (DSP), Application Specific Integrated Circuit (ASIC), Programmable Logic Array (PLA), Field Programmable Gate Array (FPGA), etc., or a combination thereof. Wireless device 400 includes a Wireless Control Protocol (WCP) interface 413 that couples to a carrier network via airnet 424 to receive incoming and outgoing signals. Device identifier (ID) storage 416 stores and supplies to WCP interface 413 a Mobile Device Identifier (MIN), which identifies wireless device 400 to outside entities (e.g. proxy server 908 a client, a server, or other network device). The MIN is a specific code that is associated with wireless device 400 and directly corresponds to a device ID in a user account typically provided in an associated proxy server, such as proxy server 908. If the proxy server services a number of wireless devices, there will be a number of such accounts, preferably kept in a database server, each of the accounts corresponding to a different one of the wireless devices.

In addition, wireless device 400 includes memory 404 that stores data and/or software for controlling and/or performing many of the processing tasks performed by wireless device 400. These tasks include: establishing a communication session with a proxy server via wireless link 432 and airnet 424; receiving user inputs from keypad 403, and displaying information on the display 402. Hence, memory 404 may represent one or more physical memory devices or facilities, which may include any type of random access memory (RAM), read-only memory (ROM) (which may be programmable), flash memory, non-volatile mass storage device, or a combination of such memory devices. Memory 404 is also coupled to WCP interface 413 for the establishment of a communication session and the requesting and receiving of data.

Assuming, for example, that wireless device is a telephone, wireless device 400 also includes voice circuitry 418 for inputting and outputting audio during a telephonic communication between the user of wireless device 400 and a remote party. Voice circuitry 418 may include, for example, sound transducers, analog-to-digital (A/D) and digital-to-analog (D/A) converters, filters, etc., such as are well known in the art. An encoder/decoder 410 is coupled between the processor 401 and the voice circuitry 418 for encoding and decoding audio signals.

Figure 1:
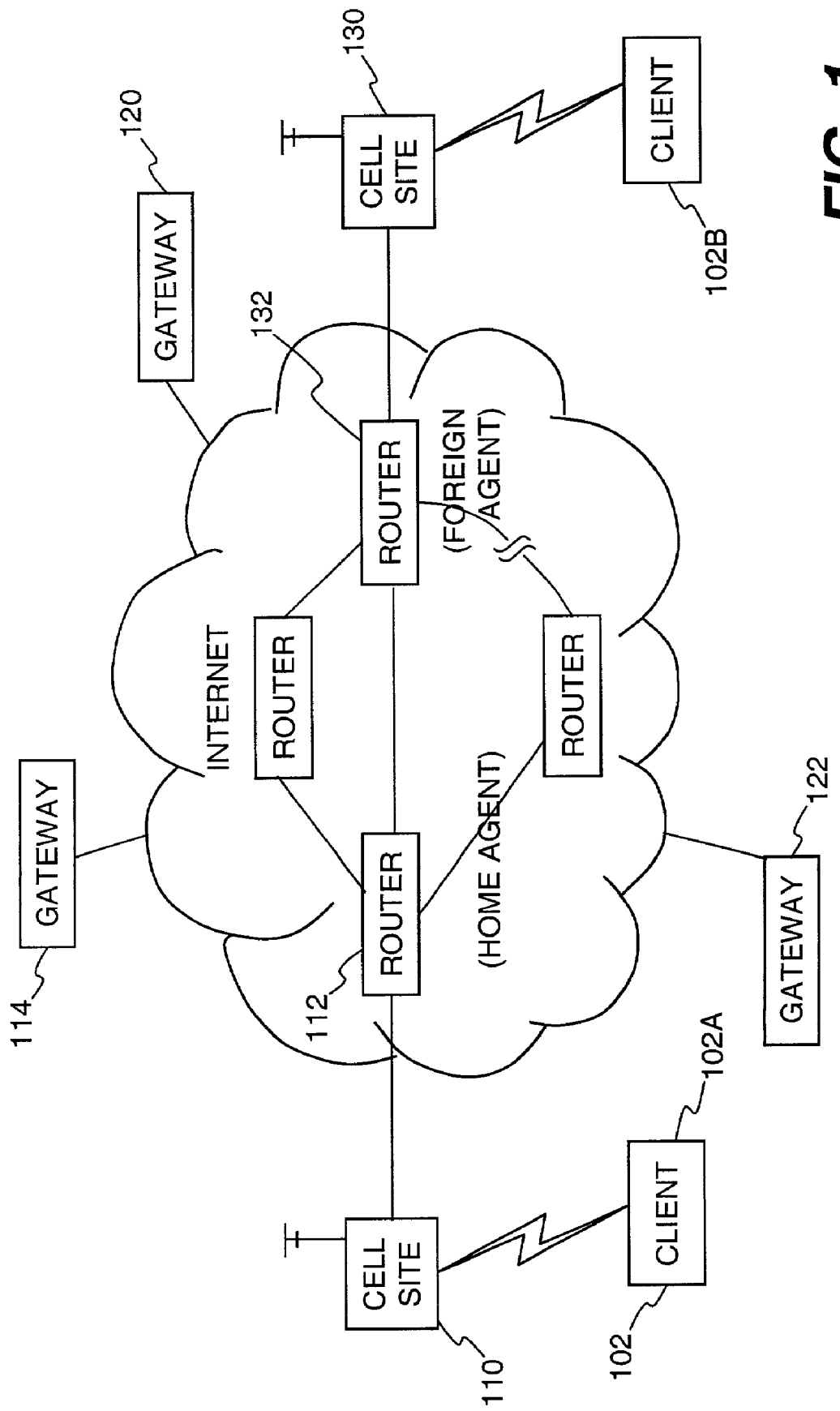
FIG. 1 illustrates a cellular telephone system and a wireless client 102 making a connection to a first cell site 110.

FIG. 5 illustrates an overview of a computer that can represent any of the agents, gateways, or wireless client represented in FIG. 1 or any other computing device described herein. As shown, the computer system 500 includes a processor 502, ROM 504, and RAM 506, each connected to a bus system 508. The bus system 508 may include one or more buses connected to each other through various bridges, controllers and/or adapters, such as are well known in the art. For example, the bus system 508 may include a "system bus" that is connected through an adapter to one or more expansion buses, such as a Peripheral Component Interconnect (PCI) bus. Also coupled to the bus system 508 are a mass storage device 510, a network interface 512 and a number (N) of input/output (I/O) devices 516-1 through 516-N.

I/O devices 516-1 through 516-N may include, for example, a keyboard, a pointing device, a display device and/or other conventional I/O devices. Mass storage device 510 may include any suitable device for storing large volumes of data, such as a magnetic disk or tape, magneto-optical (MO) storage device, or any of various types of Digital Versatile Disk (DVD) or Compact Disk (CD) based storage.

Network interface 512 provides data communication between the computer system and other computer systems such as on the Internet. Hence, network interface 512 may be any device suitable for or enabling the computer system 500 to communicate data with a remote processing system over a data communication link. Examples of network interface devices 512 include a conventional telephone modem, an Integrated Services Digital Network (ISDN) adapter, a Digital Subscriber Line (DSL) adapter, a cable modem, a satellite transceiver, an Ethernet adapter, a cellular telephone receiver transmitter or the like.

Of course, many variations upon the architecture shown in FIG. 5 can be made to suit the particular needs of a given system. Thus, certain components may be added to those shown in FIG. 5 for a given system, or certain components shown in FIG. 5 may be omitted from the given system.

It will be appreciated that the processes described above can be implemented in software stored in any of the ROM 504, the RAM 506, mass storage device 510, or a combination thereof.

One skilled in the art will appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
in response to a mobile client having changed locations, automatically testing each of a plurality of gateways to determine an optimum gateway for the mobile client from the plurality of gateways, wherein said testing includes at least one of (a) determining a number of hops required for a request to travel between a foreign agent and a selected gateway, and (b) determining an elapsed time required for the request to travel between the foreign agent and the selected gateway; and
selecting the optimum gateway for the mobile client.

2. The method of claim 1, wherein testing the selected gateway includes sending the request from a primary gateway, through the foreign agent to the selected gateway.

3. The method of claim 2, wherein the testing produces a plurality of test results and the number of hops and the elapsed time are two of the plurality of test results.

4. The method of claim 1, wherein the foreign agent includes a router.

5. The method of claim 1, wherein the optimum gateway is a wireless gateway.

6. The method of claim 1, wherein the mobile client includes a cellular telephone.

7. The method of claim 1, wherein the mobile client having changed locations comprises the mobile client moving from a home agent to the foreign agent.

8. The method of claim 7, wherein the home agent includes a router.

9. The method of claim 7, wherein the mobile client moving from the home agent to the foreign agent includes:
moving the mobile client from a first network to a second network.

10. The method of claim 1, wherein determining the number of hops required for the request includes examining an IP header of the request.

11. The method of claim 1, wherein determining the elapsed time required for the request includes examining an IP header of the request.

12. A method of selecting a gateway comprising:
testing each of a plurality of gateways to produce a plurality of test results, wherein said testing includes:
selecting a gateway from the plurality of gateways:
sending a request from a primary gateway, through a selected router to the selected gateway;
determining at least one of a group consisting of (a) a number of hops required for the request to travel between the selected router and the selected gateway, and (b) an elapsed time required for the request to travel between the selected router and the selected gateway, wherein the number of hops and the elapsed time are two of the plurality of test results; and
recording the plurality of test results for the selected gateway; and
automatically selecting an optimum gateway from the plurality of gateways, for use by a mobile client, based on results of said testing.

13. The method of claim 12, wherein selecting the optimum gateway includes:
selecting one of the plurality of gateways that has a least number of hops as the optimum gateway.

14. The method of claim 12 wherein selecting the optimum gateway includes:
selecting one of the plurality of gateways that has a least elapsed time as the optimum gateway.

15. The method of claim 12, wherein selecting the optimum gateway includes:
selecting one of the plurality of gateways that has a combination of a least elapsed time and a least number of hops as the optimum gateway.

16. The method of claim 12, wherein selecting the optimum gateway includes:
selecting one of the plurality of gateways that has a function of a least elapsed time and a least number of hops as the optimum gateway.

17. The method of claim 12, wherein the optimum gateway is a wireless gateway.

18. A system comprising:
a processor; and
a storage facility coupled to the processor and containing instructions executable by the processor which configure the system to:
automatically test each of a plurality of gateways, including instructions to:
select a gateway from the plurality of gateways:
test the selected gateway, including instructions to (a) send a request from a primary gateway, through a foreign agent to the selected gateway, (b) determine a number of hops required for the request to travel between the foreign agent and the selected gateway, and (c) determine an elapsed time required for the request to travel between the foreign agent and the selected gateway, wherein the number of hops and the elapsed time are two of a plurality of test results; and record the plurality of test results for the selected gateway; and automatically select an optimum gateway from the plurality of gateways.

19. The system of claim 18, wherein the foreign agent includes a router.

20. The system of claim 18, wherein the mobile client includes a cellular telephone.

21. The system of claim 18, wherein the optimum gateway is a wireless gateway.

22. A system for determining an optimum gateway comprising:

a processor; and a storage facility coupled to the processor and containing instructions executable by the processor which configure the system with:

means for automatically testing each of a plurality of gateways by determining at least one of (a) a number of hops required for a request to travel between a foreign agent and a selected gateway, and (b) an elapsed time required for the request to travel between a foreign agent and a selected gateway; and means for automatically selecting an optimum gateway from the plurality of gateways.

23. A wireless gateway comprising:

a processor;

a wireless network coupled to the processor;

a storage facility coupled to the processor and containing instructions executable by the processor which configure the wireless gateway to automatically test each of a plurality of gateways, wherein testing each one of the plurality of gateways includes:

selecting a gateway from the plurality of gateways;

sending a request from a primary gateway, through a foreign agent to the selected gateway;

recording a number of hops required for the request to travel between the foreign agent and the selected gateway; and recording an elapsed time required for the request to travel between the foreign agent and the selected gateway; and determine one of the plurality of gateways that has a combination of a least elapsed time and a least number of hops to be an optimum gateway.

24. The wireless gateway of claim 23 further comprising: a mobile client coupled to the wireless network.

25. The wireless gateway of claim 24, wherein the mobile client includes a web enabled cellular telephone.

26. The method of claim 23, wherein the number of hops and the elapsed time is to be determined by examining an IP header of the request.

27. The method of claim 23, wherein determining the optimum gateway further includes determining a geographic location of the foreign agent.

28. The method of claim 23, wherein the optimum gateway is a gateway to the Internet.

29. The method of claim 23, wherein the optimum gateway is a gateway to a software application.

30. A method comprising:

determining that a mobile client has moved from a home agent to a foreign agent;

in response to the mobile client having moved from the home agent to the foreign agent, testing each of a plurality of gateways, wherein testing each of the plurality of gateways includes:

selecting a gateway from the plurality of gateways;

sending a request from a primary gateway, through the foreign agent to the selected gateway;

recording a number of hops required for the request to travel between the foreign agent and the selected gateway; and recording an elapsed time required for the request to travel between the foreign agent and the selected gateway; and selecting one of the plurality of gateways that has a combination of a least elapsed time and a least number of hops as an optimum gateway.

31. The method of claim 30, wherein the home agent is a router.

32. The method of claim 30, wherein the foreign agent is a router.

33. The method of claim 30, wherein the mobile client is a wireless telephone.

34. The method of claim 30, wherein determining that the mobile client has moved from the home agent to the foreign agent includes registering the client's new address with the home agent.

35. The method of claim 30, wherein testing each of the plurality of gateways is to be initiated by a request from the client.

* * * * *